United States Patent Office 3,770,746
Patented Nov. 6, 1973

3,770,746
3'-HYDROXYQUINOPHTHALONE-
5-CARBOXANILIDE
John Blackwell, Kennett Square, Pa., and Richard A. Fenoglio, Wilmington, Del., assignors to E. I. du Pont de Nemours and Company, Wilmington, Del.
No Drawing. Filed Dec. 2, 1970, Ser. No. 94,524
Int. Cl. C07d 33/46
U.S. Cl. 260—289 QP
2 Claims

ABSTRACT OF THE DISCLOSURE

Yellow, water insoluble quinophthalone dyes, useful for dyeing cotton or synthetic fibers or blends or mixtures thereof, having the formula

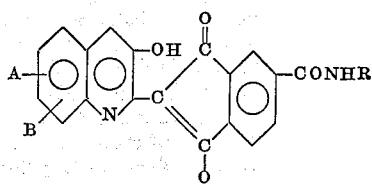

wherein A and B are the same or different and are selected from H, $C_{1-4}$ alkyl, Cl or Br or A and B together are —C=C—C=C—, and R is o-, m- or p-($C_{8-18}$ alkyl)phenyl, o-, m- or p-($C_{4-12}$alkoxy)carbonylphenyl or

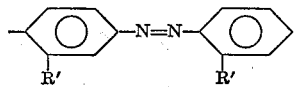

wherein R' is H or $C_{1-4}$ alkyl.

BACKGROUND OF THE INVENTION (1) Field of the invention

This invention relates to water insoluble quinophthalone dyes which have utility in the dyeing of a broad spectrum of synthetic and natural materials, especially water swellable cellulosic materials, or mixtures or blends of such synthetic and natural materials.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscous rayon.

None of these conventional procedures can be used to dye cellulose by directly introducing into the material a preformed, nonreactive, water insoluble dye since such dyes have little natural affinity for or substantivity to cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of lower water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for water swellable cellulosic materials and synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of such cellulosic and synthetic materials employing a two-stage process is U.S. Pat. 3,313,590. Analogous to the dyeing of such blends and confirming the aforesaid distinction between water swellable cellulosic materials and non-water swellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331–337 (1962) report that cotton can be swollen with water containing both high boiling, water soluble, non-reactive compounds of limited molecular weight and a cross-linking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. 832,343 disclose a process for dyeing water swellable cellulosic materials with preformed disperse dyes, that is, dyes which do not require an in situ chemical reaction, such as oxidation or reduction, for development of color on the substrate, such as a fabric, which process comprises contacting the water swellable cellulosic material in any sequence with the following:

(1) Water in an amount sufficient to swell the cellulose;

(2) A preformed dye in an amount sufficient to color the cellulose, a boiling saturated solution of which dye in 0.1 molar aqueous sodium carbonate exhibits an optical absorbance not in excess of about 30; and (3) A solvent in an amount sufficient to maintain swelling of the cellulose if water is removed, and which (a) is at least 2.5 weight percent soluble in water at 25° C.,
(b) boils above about 150° C. at atmospheric pressure,
(c) is a solvent for the dye at some temperature in the range of about 0° to 225° C., and
(d) has the formula $$R(O-\underset{\underset{C_nH_{2n+1}}{|}}{CH}-CH_2)_mR^1 \text{ or } [R(O-\underset{\underset{C_nH_{2n+1}}{|}}{CH}-CH_2)_mO]_xA$$

wherein:

$n$ is 0 or 1;
$m$ is a positive whole number;
R is H, $C_{1-8}$ alkyl, $C_{7-15}$ aralkyl or alkaryl,

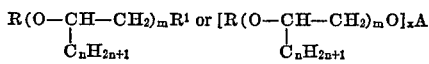

wherein $R^2$ is $C_{1-8}$ alkyl, $C_{5-10}$ cycloalykyl, $C_{7-15}$ aralkyl or alkaryl, $C_6$ aryl, $C_{10}$ aryl, or furfuryl;
$R^1$ is —OH, —OR², —SR², —NHR², —NR²($C_{1-8}$ alkyl), —NR²($C_{7-15}$ aralkyl or alkaryl),

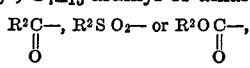

—NH(phenyl), or —NH(naphthyl), wherein R² is as defined above;
$x$ is the number of unsaturated valencies in A; and
A is ROCH₂CHORCH₂—, —CH₂CHORCH₂—,

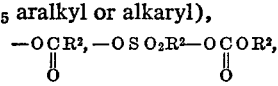

—CH₂C(CH₂OR)₃, (—CH₂)₂C(CH₂OR)₂, (—CH₂)₃CCH₂OR, (—CH₂)₄C,

—CH₂(CHOR)$_y$CH₂OR, —CH₂(CHOR)$_y$CH₂—, or —CH₂(CHOR)$_{y-z}$(—CH)$_z$CH₂—, in which $y$ is 2, 3 or 4; $z$ is 0, 1, 2, 3 or 4 but no greater than $y$; and R is as defined above;

provided that at some stage during the process the interior of the swollen cellulose is contacted with a solution of the preformed dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

OBJECTS AND SUMMARY OF THE INVENTION

It is an object of the present invention to provide yellow water insoluble quinophthalone dyes which are useful in the above-described process of Blackwell et al., for dyeing water swellable cellulosic materials and blends or mixtures thereof with synthetic materials. It is a further object to provide dyes which give a good balance of shade when used to dye the aforesaid blends or mixtures. Another object is to provide water insoluble dyes which exhibit good fastness to light, washing, crocking and sublimation when applied to water swellable cellulosic materials, synthetic materials or blends or mixtures of such cellulosic and synthetic materials. Still another object is to provide water insoluble dyes which are useful for dyeing synthetic materials by conventional procedures.

In summary, the present invention resides in the discovery of dyes having the formula

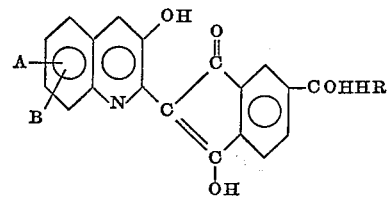

wherein A and B are adjacent and are the same or different and are selected from H, $C_{1-4}$ alkyl, Cl or Br or A and B together are —C=C—C=C—, and R is o-, m- or p-($C_{8-18}$ alkyl)phenyl, o-, m- or p-($C_{4-12}$ alkoxy)carbonylphenyl or

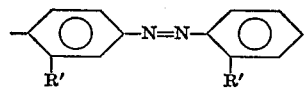

wherein R' is H or $C_{1-4}$ alkyl. The preferred dye herein is the above wherein A and B are H and R is p-dodecylphenyl.

DETAILED DESCRIPTION OF THE INVENTION

The aforesaid yellow quinophthalone dyes of this invention are prepared by condensing a quinophthalone acid halide of the formula

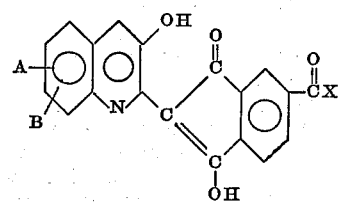

with an amine R—NH₂. In the above Formulas A, B and R are as previously defined and X is Cl or Br. The condensation is carried out using conventional condensation quantities and conditions. For example, the reactants can be heated in a suitable organic solvent such as chlorobenzene or o-dichlorobenzene. If desired an acid acceptor can be present, for example, a tertiary amine or sodium carbonate.

Suitable amines of the formula RNH$_2$ include those shown in Table 1.

TABLE 1 o-Octylaniline
p-Octadecylaniline
m-Dodecylaniline
Anthranilic acid, butyl ester
m-Aminobenzoic acid, octyl ester
p-Aminobenzoic acid, dodecyl ester
p-(Phenylazo)aniline
4-(o-tolylazo)-2-toluidine
4-(o-n-butylphenylazo)-2-n-butylaniline The quinophthalone acid halide can be prepared by well known prior art techniques. The following description represents but one example of such known procedures. An isatin appropriately substituted with the aforesaid groups A and B is reacted with chloroacetone in the presence of calcium hydroxide to yield the substituted 3-hydroxy-2-methyl-4-quinolinecarboxylic acid. The acid is condensed with trimellitic acid or trimellitic acid or trimellitic anhydride by heating in an inert solvent such as o-dichlorobenzene to yield the substituted quinophthalone-5-carboxylic acid. This acid is reacted with thionyl chloride or bromide by heating in an inert solvent such as nitrobenzene to yield the desired quinophthalone acid halide of the above formula.

Suitable isatins which are useful herein include those shown in Table 2.

TABLE 2

| | |
|---|---|
| isation | 5-phenylisatin |
| 7-ethylisatin | 6-phenylisatin |
| 5-butylisatin | 4,5-benzoisatin |
| 4,7-dimethylisatin | 5,7-dichlorisatin |
| 7-ethyl-5-methylisatin | 5,7-dibromoisatin |
| 6-chloro-7-methylisatin | |

The cellulosic materials which can be dyed with the dyes of this invention by the previously described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also include is cotton which has been treated in any way which does not significantly reduce its swelling upon heating with water; raw or scoured cotton and cotton which has been mercerized or otherwise preshrunk are dyeable with the dyes of this invention. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with dilute aqueous caustic or the dyeing can be carried out in the presence of wetting agents, preferably of the nonionic type. Mixtures of cotton and rayon fibers can be dyed, and the present dyes also can be used to dye purified wood pulp and paper. Excluded herein as the water swellable cellulosic material is cellulose acetate which does not exhibit the requisite swellability in the presence of water.

The synthetic materials which can be dyed with the dyes of this invention include polyesters, polyamides, cellulose ethers and esters, and copolymers and mixtures thereof with other components intended to make them more easily dyeable or to add other desirable properties. The dyes can be applied to synthetic materials by conventional procedures, such as the Thermosol or aqueous dyeing procedures. They also may be applied to such materials from solution in an organic solvent. Halocarbons such as perchloroethylene are particularly suitable solvents for this purpose since their low specific heats and latent heats of vaporization and low boiling points result in (a) a low power requirement to raise the dyebath temperature to and maintain it at the boil, and (b) ease of recovery of the solvent. Other advantages of the chlorinated solvents, such as nonflammability, low toxicity, and the like are readily apparent.

Surprisingly, the utility of the dyes of this invention in the solvent dyeing of polyester from perchloroethylene is not shared by the isomeric N-alkylanilino dyes.

The dyes of this invention can be applied to water swellable cellulosic materials, or to blends or mixtures thereof with synthetic materials by the above-described Blackwell et al. process. The dyes of this invention are particularly useful for dyeing mixtures and blends of cotton and polyester or polyamide, such as mixtures containing 50 to 80% polyethylene terephthalate and 20 to 50% cotton. In such mixtures, the synthetic material is dyed using conventional process conditions. Since the dyes of this invention can be used to dye both components in a blend or mixture, scourability as a factor in dye selection is avoided since the previously described cross-staining problem has been minimized.

The dyes of this invention dye the substrate directly, that is, they do not required oxidation, reduction, hydrolysis, or any other chemical modification for development of color or fastness. The dyes exhibit excellent fastness to light, crocking, washing, sublimation and drycleaning.

In dyeing cellulosic materials with the dyes of this invention using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye pad bath followed by squeezing to remove excess dye liquor, or to print with a solvent-containing printing paste, and subsequently heating to evaporate sufficient water to effect diisolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dye baths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dye baths used in practicing this invention also can contain dyes other than those of this invention; for example, direct dyes or fiber reactive dyes for cotton or for polyamides can be present for shading purposes.

In the preferred dyeing procedure with the dyes of this invention, an aqueous dye dispersion and the organic solvent are applied to the fabric from a single padbath. The amount of water in the padbath usually is 70–95% weight percent and the solvent, 5–30 weight percent. The padded fabric is heated at 180–225° C. for 30–180 seconds. For cotton, temperatures as low as 150° C. usually are adequate. The dye fabric generally is given an aqueous scour, or an aqueous scour followed by a perchloroethylene scour, to ensure complete removal of surface dye.

The following experiments show the utility of the dyes of this invention.

Dyeing 65/55 "Dacron" polyester/cotton blend fabric (A) A padbath was prepared from:

|  | Grams |
| --- | --- |
| An aqueous yellow dye paste (15% active ingredient) containing the dye of Example 1 | 50 |
| Purified vegetable gum thickener | 20 |
| Methoxypolyethylene glycol (molecular weight 350) | 100 |
| Water to 1 liter. | |

A continuous length of 65/35 "Dacron" polyester/cotton fabric was padded at 60% uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously moving fabric was passed through a circulating air oven at 80–100° C., with a hold-up time of one minute, and then through an oven at 200–210° C. with a hold-up time of 1.7 minutes. The hot, dry fabric was cooled to room temperature and rinsed for one minute each in sequence: in water at 20–30° C., in water at 90–95° C., at 90–95° C. in water containing 1% of an ether-alcohol sulfated detergent, in water at 90–95° C., and in water at 20–30° C. The material was dried and then scoured for 5 minutes in prechloroethylene at 50° C. Uniform deep yellow shades of good fastness were produced.

(B) Experiment A was repeated except that the heating was carried out as follows. The padded fabric was passed at a rate of 2 yards per minute between banks of infrared lamps, with one 1,000 watt lamp (Fostoria-Fannon, Inc., Infrared Heater Model 6624) shining on each surface perpendicular to the fabric from a distance of about 3 inches. The moist fabric was then passed over a series of four revolving smooth-surface drums increasing stepwise in temperature from 100° C. to about 150° C. The average contact time on each drum was about 18 seconds. Next, the fabric moved continuously into an oven held at about 210° C. where the total contact time was about 90 seconds.

(C) Experiment A was repeated except that the dye of Example 2 was employed. The polyester-cotton blend fabric was uniformly dyed a deep yellow shade of good fastness.

(D) Experiment C was repeated except that the heating was carried out as in Experiment B.

Dyeing cotton broadcloth (E) Experiment A was repeated except that a 100% mercerized cotton broadcloth was employed, the amount of glycol was increased to 150 grams, and the maximum temperature was reduced to about 180° C. The cotton cloth was dyed a deep, uniform yellow shade of good fastness.

(F) Experiment B was repeated, employing the modifications recited in Experiment E.

Printing of 100% cotton fabric (G) A cotton fabric was padded to about 70% pickup with an aqueous solution containing 200 grams per liter of polyethylene glycol (M.W. 600). The padded fabric was heated at 160 °C. for 5 minutes to evaporate water. The fabric was then printed in a pattern with a print paste prepared from:

|  | Grams |
| --- | --- |
| An aqueous yellow paste (15% active ingredient) containing the dye of Example 3 | 10 |
| Purified natural gum ether thickener | 60 |
| Water | 30 |

The printed fabric was heated at 180° C. for 100 seconds, scoured in water containing an ether-alcohol sulfate detergent at about 90° C. for 5 minutes, dried, scoured in tetrachloroethylene at about 50° C. for 5 minutes and dried. The printed areas were strongly dyed in a yellow shade.

Printing of 65/35 "Dacron" polyester/cotton blend fabric (H) Experiment G was repeated except that a 65/35 "Dacron" polyester/cotton fabric was employed and the maximum temperature was incorporated to 200° C.

Dyeing of "Dacron" polyester

The dyes of this invention can be applied to synthetic fibers by conventional aqueous or pad-heat procedures. The following experiment shows the amenability of these dyes to the Thermosol process.

(I) "Dacron" polyester fabric was immersed for fifteen minutes at 180° F. in an aqueous bath containing 1% ether-alcohol sulfate surface active agent and 1% tetrasodium pyrophosphate. The fabric was rinsed in cold water, dried and then padded at 40–50% pickup, based on dry fabric weight, in a dyebath containing:

|  | Grams |
| --- | --- |
| An aqueous yellow dye paste (15% active ingredient) containing the dye of Example 1 | 50 |
| Purified natural gum thickener | 20 |
| Water to 1 liter. | |

The padded material was passed through an infrared predryer, then heated to and held at 415° F. for 90 seconds. The fabric was rinsed in water at 80° F., scoured for 5 minutes at 200° F. in water containing 1% ether-alcohol sulfate detergent, rinsed in water at 80° F. and dried. The polyester fabric was dyed a deep yellow shade.

Fabric samples from Experiments A and C were evaluated for fastness using standard tests described in "Textile Manual of American Association of Textile Chemists and Colorists," vol. 45, 1969. The results are reported in Table 3. The first three columns show the shade change of the dyed fabric, the next two show the degree of stain on an undyed acetate or nylon fabric, and the last shows the sublimation into the undyed polyester/cotton fabric. The ratings are expressed with the following symbols:

5=negligible shade change
4=slight shade change
3=noticeable shade change
2=considerable shade change
1=much shade change
W=weaker
Br=brighter

TABLE 3

| Fabric | Lightfastness (Xenon Arc) | | Washfastness (AATCC 36-1969, No. III) | | | Sublimation (410° F.) |
| --- | --- | --- | --- | --- | --- | --- |
|  | 20 hrs. | 40 hrs. | Shade change | Acetate | Nylon |  |
| Experiment: | | | | | | |
| A | 5 | 5-4 Br | 5 | 5 | 4 | 5 |
| C | 5 | 5-4 Br | 5 | 5 | 4 | 5 |

Surprisingly, it has been found that certain colored dispersing agents, such as "Marasperse" B or "Polyfon" O (both lignin sulfonates), can be employed to impart a brown stain to cotton or polyester-cotton blends by the procedures described above, which stains cannot be removed completely during the scouring procedure. These stains, however, have poor fastness to light. If the yellow dyes of this invention are dispersed in the presence of such dispersing agents and the aqueous dye pastes are then dyed or printed onto cotton or cotton blend fabrics, the shade of the dyed material appears to grow gradually brighter on exposure to light in a Xenon Arc Fade-Ometer as the stain from the dispersant is destroyed. In contrast, dye pastes that contain essentially colorless dispersing agents, such as "Blancol" (a sulfonated napthaleneformaldehyde condensate), give bright shades that show virtually no change after 40 hours in a Xenon Arc Fade-Ometer. For example, Table 4 shows the results obtained when two samples of the dye of Example 5 were dispersed to aqueous pastes in (a) "Polyfon" O, and (b) "Blancol," respectively, and dyed onto 65/35 polyester-cotton blend fabric by the method of Experiment A above.

TABLE 4

| Dye | Light-fastness (Xenon Arc Fade-Ometer) | |
|---|---|---|
| | 20 hours | 40 hours |
| Example 5 plus "Polyfon" O | 3 Br | 3 Br |
| Example 5 plus "Blancol" | 5 | 5-4 Br |

As a measure of which dispersing agents are acceptable and which are unacceptable for use as dispersants for the subject dyes, the "Relative Color Value" (RCV) of several dispersants can be determined as follows:

$$RCV = 100 \ (A_{max.})$$

$$A_{max.} = \frac{\text{absorbance at 380 millimicrons (m}\mu\text{)}}{\text{concentraton in grams per liter}}$$

The absorbance of several dispersing agents at 380 m$\mu$ (the visual limit at the blue end of the spectrum) was measured spectroscopically and the RCV of each calculated. "Marasperse" B with an RCV of 100 is considered to be borderline; this figure is taken as the maximum acceptable value. "Polyfon" O with an RCV of 283.3 is well above the acceptable maximum. In contrast, "Blancol" with an RCV of 2.2 is well below the acceptable maximum.

Other common dispersing agents which are acceptable are listed in Table 5.

TABLE 5

Relative color value of dispersing agents

| Dispersing agent: | Relative color value (RCV) |
|---|---|
| "Blancol" | 2.218 |
| "Dispersol" AC | 0.426 |
| "Lomar" D | 5.000 |
| "Lomar" PW | 1.666 |
| "Tamol" N | 2.217 |
| "Tamol" 731 | 0.069 |
| "Tamol" 850 | 0.082 |
| "Darvon" No. 1 | 2.777 |
| "Daxad" KLS | 5.521 |
| "Daxad" 30 | 0.071 |
| "Petro" 250 | 1.666 |
| "Nycol" NSR | 3.055 |
| "Nycol" NNC | 2.654 |
| "Trenamine" W-25 | 0.044 |

Solvent dyeing of polyester fibers (J) A 5-gram swatch of fabric made from polyethylene terephthalate was heated to the boil for 1 hour in 400 grams of perchloroethylene containing 0.1 gram of the dye of Example 1. A deep yellow shade was produced on the polyester fabric.

The experiment was repeated using in place of the dye of Example 1 0.1 grams of the iomeric N-octylanilino dye (prepared by the procedure of Example 1 except that 41 parts of p-octylaniline were replaced by 41 parts of N-octylaniline). Only a slight stain was produced when an attempt was made to dye the polyester fabric.

Dyeing 65/35 nylon/cotton blend fabric (K) A padbath was prepared from:

| | Grams |
|---|---|
| An aqueous yellow dye paste (15% active ingredient containing the dye of Example 2 | 50 |
| Purified vegetable gum thickener | 20 |
| Dipropylene glycol | 200 |
| Water to 1 liter. | |

A continuous length of 65/35 nylon/cotton fabric was padded at 60% uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously moving fabric was passed through a circulating air oven at 80–100° C., with a hold-up time of one minute, and then through an oven at 180–190° C. with a hold-up time of 1.7 minutes. The hot, dry fabric was cooled to room temperature and rinsed for one minute each in sequence: In Perchloroethylene at 50° C., in water at 20–30° C., in water at 90–95° C., at 90–95° C. in water containing 1% of an ether-alcohol sulfate detergent, in water at 90–95° C., and in water at 20–30° C. The material was dried and subjected to a permanent-press procedure as follows. An aqueous padbath was made from:

| | Grams |
|---|---|
| "Permafresh" 183 | 200 |
| "Triton" X-100 | 2.5 |
| "Mykon" SF | 22.5 |
| "Rhoplex" HA-8 | 22.5 |
| "Silkand" 40 | 20 |
| Catalyst X-4 | 36 |
| Water to 1 liter. | |

"Permafresh" 183 is an imidazolidone derivative which serves as the reactant for wash-wear garments by the deferred curing process; "Triton" X-100 is an alkylarylpolyether alcohol which serves as a wetting and emulsifying agent; "Rhoplex" HA-8 is an acrylic dispersion of a thermoplastic resin which serves as a binder; Catalyst X-4 is a curing catalyst for thermosetting resins (it contains a zinc salt complex); "Mykon" SF is a nonionic, paraffin-free, polyethylene emulsion which serves as a fabric softener; and "Silkand" 40 is a nonionic polymer emulsion which imparts luster, a silky hand and antistatic properties to the fabric.

The resin-impregnated material was air dried and cured at 325° F. for 15 minutes.

Table 6 shows the results of fastness tests which were run on the uniformly dyed yellow material.

TABLE 6

| Light-fastness (40 hours Xenon) | Washfastness (AATCC 61-1968, No. IIIA)— shade change | Sublimation (410° F.) |
|---|---|---|
| 4 | 4-3W | 5 |

The following examples illustrate the preparations of dyes of this invention. All parts are given by weight.

EXAMPLE 1

Preparation of 3'-hydroxyquinophthalone-5-carboxy-p-octylanilide

A mixture of 32.5 parts of 3'-hydroxyquinophthalone-5-carboxylic acid and 350 parts of monochlorobenzene was treated at room temperature with 2.1 parts of dimethylformamide and then with 21 parts of thionyl chloride. The reaction mixture was heated to 80°–85° C. for 8 hours and then allowed to cool to room temperature overnight. 15 parts of sodium carbonate were then added and the mixture was stirred for 30 minutes. 41 parts of p-octylaniline were added and the reaction mixture was heated to 70°–80° C. for 3 hours, and then to 125° C. for 3 hours. The reaction mixture was allowed to cool to room temperature overnight. The product was isolated by filtration, washed three times with monochlorobenzene, then with isopropanol, and finally with water. The cake was reslurried in 1 N-sodium carbonate solution, isolated by filtration, washed with water until alkali-free, and dried. 18 parts of dye were obtained; the product melted partially at 194–214° C., but mostly at 260°–265° C., and had an absorptivity of 58.0 liters gram$^{-1}$ cm.$^{-1}$ at 443 m$\mu$.

Thin layer chromatography on silica gel-coated glass plates, using benzene:ethyl acetate=3:2 as eluent, indicated no starting material in the yellow dye. Found: C, 73.7, 73.4; H, 6.2, 6.4; N, 5.4, 5.4. Calc'd for $C_{22}H_{32}N_2O_4$: C, 76.15; H, 6.15; N, 5.38.

Based on the above, the structurue of the dye is

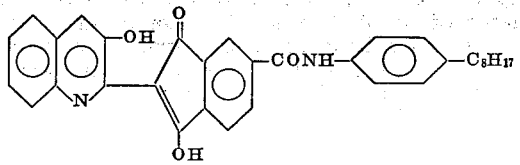

EXAMPLE 2

Preparation of 3'-hydroxyquinophthalone-5-carbox-p-dodecylanilide

A mixture of 275 parts of chlorobenzene and 25 parts of 3'-hydroxyquinophthalone-5-carboxylic acid was heated with stirring to 50° C. and treated with 1.1 parts of dimethylformamide and then with 16 parts of thionyl chloride (added dropwise). The reaction mixture was stirred at 81–85° C. for 8 hours, after which the excess thionyl chloride was removed by sweeping the system with nitrogen. The reaction mixture was cooled to 40° C. and 76 parts of p-dodecylaniline were added. The mixture was heated to the reflux temperature. The product was isolated by filtration, washed thoroughly with ethanol, then with hot water, and dried. 21 parts of product were obtained; the product melted at 184–185° C. and had an absorptivity of 87.4 liters gram$^{-1}$ cm.$^{-1}$ at 440 m$\mu$. Thin layer chromatography indicated one colored component only. Based on the above, the yellow dye has the structure.

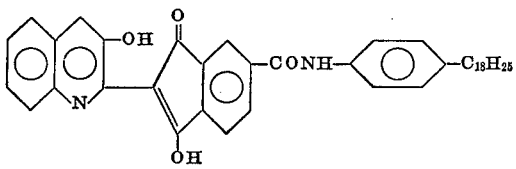

EXAMPLE 3

Preparation of 3'-hydroxyquinophthalone-5-carbox-p-octadecylanilide

When 76 parts of p-dodecylaniline were replaced by 132 parts of p-octadecylaniline in the procedure of Example 2, a chromatographically pure dye was obtained having the same shade and fastness properties on cotton-polyester blend fabric as the dye of Example 2. Based on the above, the yellow dye has the structure

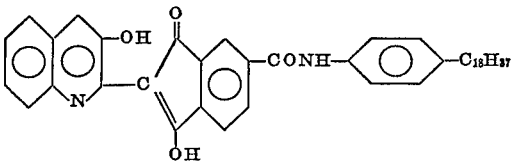

EXAMPLE 4

Preparation of 3'-hydroxy-5',6'-benzoquinophthalone-5-carbox-p-dodecylanilide

When 25 parts of 3'-hydroxyquinophthalone-5-carboxylic acid were replaced in the procedure of Example 2 by 29 parts of 3'-hydroxy-5',6'-benzoquinophthalone-5-carboxylic acid, a yellow dye was obtained which was shown by thin layer chromatography to contain no colored impurities. Based on the above, the dye has the structure.

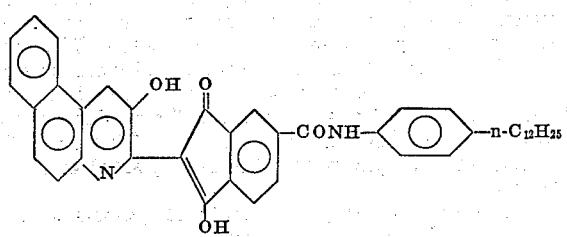

It was redder in shade than the dye of Example 2. Cotton and polyester fibers were dyed in yellow shades of good fastness with this dye by the methods described in Experiments A to I.

EXAMPLE 5

Reaction of 3'-hydroxyquinophthalone-5-carbonyl chloride with 4-(o-tolylazo)-2-toluidine A stirred mixture of 52.5 parts of 3'-hydroxyquinophthalone-5-carbonyl chloride, 36 parts of 4-(o-tolylazo)-2-toluidine, 15 parts of sodium carbonate and 1100 parts of chlorobenzene was heated to 92–98° C. for 30 minutes. The mixture was then heated to the reflux temperature for 4½ hours and then allowed to cool to room temperature with stirring overnight. The product was isolated by filtration and washed in sequence with benzene, ethanol, hot 1 N-sodium carbonate solution and boiling water. The last two washes were continued until the washings were clear. Weight of dried dye was 15 parts. The dye was shown by thin layer chromatography to be free of colored impurities; it exhibited an absorption maximum at 440 m$\mu$. Based on the above, the dye has the structure

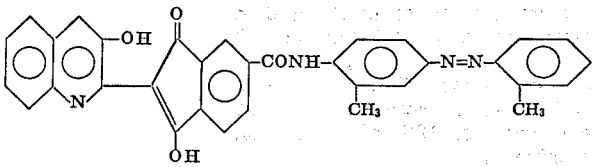

65/35 polyester-cotton blend fabric was union-dyed in yellow shades with this dye; the fastness properties were equivalent to those of the dye of Example 1.

EXAMPLE 6

Reaction of 3'-hydroxyquinophthalone-5-carbonyl chloride with p-(phenylazo)aniline When 36 parts of 4-(o-tolylazo)-2-toluidine in the procedure of Example 5 were replaced by 31.5 parts of p-(phenylazo)aniline, a dye was obtained of similar shade and equivalent fastness properties on 65/35 polyester-cotton blend fabric. Based on the above, the dye has the structure

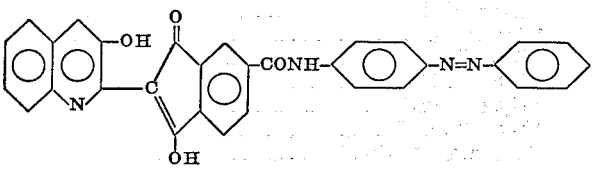

EXAMPLE 7

Reaction of 3'-hydroxyquinophthalone-5-carbonyl chloride with octyl anthranilate A mixture of 65.4 parts of 3'-hydroxyquinophthalone-5-carbonyl chloride, 67 parts of octyl anthranilate, 24.2 parts of N,N-diethylaniline and 950 parts of monochlorobenzene was heated to the reflux temperature with stirring for 1½ hours. The reaction mixture was allowed to cool to 80° C. and 500 parts of ethanol were added to precipitate the dye. When the reaction mixture had cooled to room temperature, the product was isolated by filtration, recrystallized twice from a dimethylformamide-water system and dried. The yellow dye which was chromatographically pure had a melting point of 165–166° C.; yield was 77 parts. Based on the above, the dye has the structure

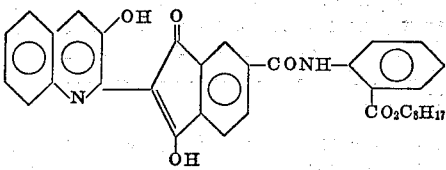

Yellow shades of excellent fastness properties were produced on 65/35 polyester-cotton blend fabric by the procedures described above.

The embodiments of the invention in which an exclusive property or privilege is claimed are defined as follows:

1. Yellow water insoluble quinophthalone dye having the formula

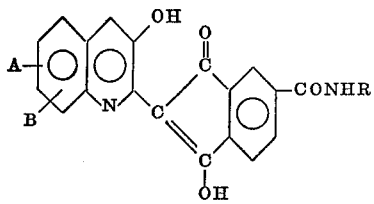

wherein A and B are adjacent and are the same or different and are selected from H, $C_{1-4}$ alkyl (but not adjacent t-butyl) Cl or Br or A and B together are

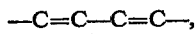

and R is o-, m- or p-($C_{8-18}$alkyl)phenyl, o-, m- or p-($C_{4-12}$alkoxy)carbonylphenyl 2. The dye of claim 1 having the formula

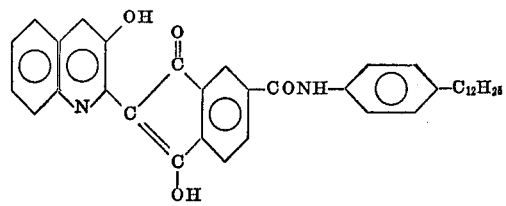

References Cited
UNITED STATES PATENTS

| | | | |
|---|---|---|---|
| 3,023,213 | 2/1962 | Richter | 260—287 |
| 3,374,238 | 3/1968 | Wick | 260—287 |

DONALD G. DAUS, Examiner

U.S. Cl. X.R.

8—54.2, 178, 179; 260—155, 287 R, 326.16

PO-1050
(5/69)

UNITED STATES PATENT OFFICE
CERTIFICATE OF CORRECTION

Patent No. 3,770,746   Dated Nov. 6, 1973

Inventor(s) John Blackwell and Richard A. Fenoglio

It is certified that error appears in the above-identified patent and that said Letters Patent are hereby corrected as shown below:

Column 13, lines 17, 18 and 19 should read -- wherein A and B are the same or different and are selected from H, $C_{1-4}$ alkyl (but not adjacent t-butyl), Cl or Br or A and B are adjacent and together are --; line 22, insert a period at the end of the claim.

Signed and sealed this 16th day of July 1974.

(SEAL)
Attest:

McCOY M. GIBSON, JR.
Attesting Officer

C. MARSHALL DANN
Commissioner of Patents